Oct. 3, 1967 J. A. JACKSON 3,345,623

MOVABLE HEAD AND TAPE CONTROL SYSTEM

Filed Nov. 13, 1963

Inventor
JOHN ALFRED JACKSON
By
Browne, Schuyler & Beveridge
Attorneys

United States Patent Office 3,345,623
Patented Oct. 3, 1967

3,345,623

MOVABLE HEAD AND TAPE CONTROL SYSTEM

John A. Jackson, Southend-on-Sea, Essex, England, assignor to E. K. Cole Limited, Southend-on-Sea, England Filed Nov. 13, 1963, Ser. No. 323,484
Claims priority, application Great Britain, Nov. 15, 1962, 43,160/62
9 Claims. (Cl. 340—174.1)

Figures 1, 2:
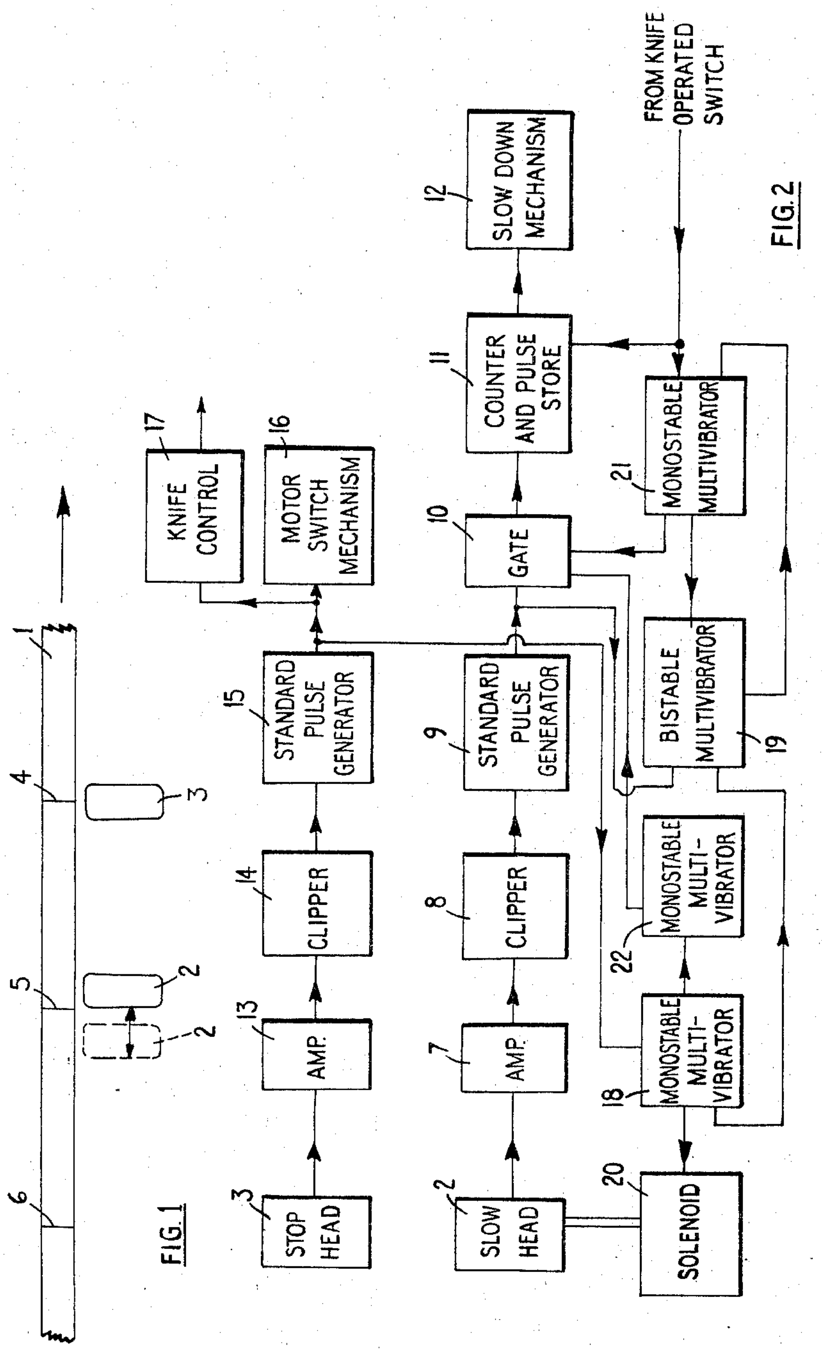

This invention relates to control apparatus for machines of the type in which a body in the machine and a magnetic track are advanced forwards step by step and in synchronism to a position where an operation is to be performed on the body. In such apparatus a signal recorded on the track is received by a pickup head to stop the body. The stopping of the body and the track is not instantaneous and during at least part of the stopping period and during the period when the rack recommences to move, there will be a very small relative speed only between the track and the head. It is possible that, due to the small relative speed between the track and the head, any signal passing the head when, for example, the track recommences to move, may not be received as a usable signal. The magnetic track may be of any known type, for example, a magnetic tape or magnetic wire.

A feature of the present invention is a control apparatus for a machine of the type referred to, in which a pickup head is adapted to be moved backwards over a predetermined length of the track, during each stopping period, and then be returned to its normal position, the said backward movement of the head increasing the relative speed between the track and the head so that any signal received by the head during its said backwards movement is of sufficient amplitude to be subsequently used to control the operation of the machine. It is arranged that if a signal be received when the head is moving in said backwards direction, the output of the head is rendered ineffective when the said head is returned to its normal position. Furthermore, if a signal be received by the head during said backwards movement, the output of the head is rendered ineffective when the tape recommences to move forwards, until the said predetermined length of the tape has passed the normal position of the head.

The invention may be applied to a control apparatus for a machine of the type referred to where a signal on a magnetic track is received by a first pickup head to cause a slowing down of the body and, after a predetermined interval, by a second pickup head to stop the work.

Accordingly, a further feature of the invention is a control apparatus of the type referred to in which a signal recorded on the track is adapted to be received by a first pickup head to cause a slowing down of the track and, after a predetermined interval, by a second pickup head to stop the track, comprising means whereby when a signal is received by the second head, the first head is adapted to be moved backwards to scan a predetermined length of the track and then be returned to its normal position, the said backwards movement of the first head increasing the relative speed between the track and the first head so that any signal received by the first head during its said backwards movement is of suffiicent amplitude to be subsequently used to control the operation of the machine.

The above and other features of the invention will be more readily understood by a perusal of the following description having reference to the accompanying drawings in which FIGURE 1 illustrates the principle of the invention as applied to a paper-cutting guillotine and FIGURE 2 is a block schematic circuit diagram which may be used in carrying out the invention.

In the drawing a magnetic tape 1 is adapted to move over a "slow" head 2 and a "stop" head 3. The tape has recorded thereon marks 4, 5 and 6 which form part of a programme of marks which are used to control the operation of a paper-cutting guillotine. When the mark 4 passes the head 2 a pulse is developed in the head to cause a slowing down of the backfence and the tape. The tape continues to pass over the heads until the mark 4 is received by the head 3, thereby causing the backfence to stop so that a cutting operation may be carried out. However, this stopping is not carried out instantaneously and a mark such as 5, may pass over the head 2 during the stopping interval. The distance the backfence moves after a pulse is received may be, say, 0.025 inch. Since there is a small relative speed only between the tape and the head 2 during the stopping interval, a usable pulse may not be received at the head 2 due to the movement of the tape thereover. Therefore, after the cutting operation has been effected, the backfence may commence at its fast speed with a subsequent error in the stopping position of the backfence at the next position of cut. This is avoided by the following method.

When a "stop" pulse is received by the head 3, the head 2 is caused to move over a predetermined length of the tape approaching the head 2 and then return to its normal position. By this means, when the head 2 is moving in a direction which opposes that of the tape, i.e. to the left in the drawing, the relative speed of the head 2 and the tape is increased sufficiently to ensure that the mark 5 causes a pulse of sufficiently large amplitude to be developed at the head. Since the relative speed of the head 2 and the tape is also small when the tape commences to move after a cutting operation, the distance through which the head moves is suitably adjusted to cover this period. Assuming that the tape moves at twice the speed of the backfence of the guillotine, the head 2 may be moved 1/16 inch in each direction. The movement of the head 2 may be controlled by a solenoid (not shown) whose operation is, in turn, controlled by the "stop" pulses which are developed in the head 3. When the head 2 is moved in the direction which opposes that of the tape, any pulse which is developed in the head 2 is stored so that after the subsequent cutting operation, the backfence commences to move at its slower speed. If any pulse is received by the head 2 when it moves in the direction which opposes that of the tape, the output of the head is rendered ineffective when the head returns to its normal position. This ensures that the same mark is not received twice. Furthermore, if such a pulse is received by the head 2, it is arranged that when the tape subsequently commences to move, the output of the head is rendered ineffective until the predetermined length of the tape has passed the head 2. Since there is a minimum spacing between the marks on the tape, say 1/8 inch if the tape moves at twice the speed of the backfence, the period during which the output of the head 2 is rendered ineffective is not critical.

A method of carrying out the invention will now be described with reference to FIGURE 2. The circuit is arranged so that signals may be fed only in the direction shown by the arrows. The heads are identified in the same way as in FIGURE 1.

When a mark such as 4 in FIGURE 1 passes over the slow head 2 a pulse is received by the head. This pulse is fed via an amplifier 7, a clipper 8, a standard pulse generator 9, a gate 10 and a counter and pulse store 11 to a slow down mechanism 12 so that the backfence is slowed down and the paper approaches a cutting position at a slow speed. The slow speed may be, for example, 0.25 inch per second while the fast speed may be, for example, 6 inches per second. When the mark 4 (FIGURE 1) passes the stop head 3 a pulse is fed via an amplifier 13, a clipper 14 and a standard pulse generator 15 to a motor switch mechanism 16 to stop the advance of the work and also to a knife control 17 to cause the paper to be cut. To ensure that a mark such as 5 (FIGURE 1) will, on passing the head 2, cause a pulse of suitable amplitude to be developed at the output of the head, the output of the generator 15 is also fed to a monostable multivibrator 18. This turns on 18 which then provides an output signal for a period of 50 msecs. This output is fed to a bistable multivibrator 19 to bias it so that on receipt of a pulse from the generator 9 it will change its state of operation. The output from 18 is also used to energise a solenoid 20 which causes the head 2 to scan a predetermined length of the tape approaching the head, so that the relative speed between the tape and the head is increased. If, during this movement, the head passes a mark such as 5 in FIGURE 1, a corresponding pulse is developed at the output of 9 and fed via the gate 10 to the counter and pulse store 11 so that when the backfence recommences to move, it will do so at the slow speed. The output of 9 is also fed to the multivibrator 19 to change its state of operation and provide an output signal which is used to bias a monostable multivibrator 21 so that it will turn on when it receives a signal from a knife operated switch (not shown) as hereinafter described. When the solenoid 20 has scanned the predetermined length of the tape as aforesaid (i.e. after 50 msecs.), 18 reverts to its orignal state and sends a signal to a monostable multivibrator 22 which is turned on for the next 50 msecs. (i.e. the interval when the head 2 is returning to its original position). Although the signal from 18 to 19 is removed, 19 maintains its state of operation. The output of 22 closes the gate 10 so that the pulse developed at 9, due to the head repassing the mark 5 (FIGURE 1) will not be fed to the store 11. After 50 msecs. 22 switches off and the gate 10 is opened. When a cut has been made and the backfence recommences to move at its slow speed, a signal is fed from the knife operated switch to remove from the store 11 the pulse which originally caused a slowing down of the backfence. The signal from the knife operated switch is also fed to 21 to turn it on for a period of, for example, 500 msecs., the output of 21 then being used to cause the multivibrator 19 to return to its original state and to reclose the gate 10 so that on the mark 5 once again passing the head no pulse is fed to 11.

If, when being moved, the head 2 passes no such pulse as 5 (FIGURE 1), the bistable multivibrator 19 and the monostable multivibrator 21 will not be operated and the backfence will recommence to move at its fast speed.

If required, a second stop head may be employed so that the knife control is operated only when each stop head provides a pulse output. This may be accomplished by having two tracks with the same information recorded thereon, the outputs of the heads being fed to a coincidence gate in the input of 17. This ensures that a spurious pulse on one of the tapes will not cause the knife to be operated.

Various modifications may be made without exceeding the scope of the invention. For example, the magnetic tape may be replaced by, for example, a magnetic wire.

I claim:

1. In a machine of the type in which the intermittent step by step forward movement of a body to a position where an operation is to be performed thereon is adapted to be controlled by a magnetic track movable step by step in synchronism with said body, discrete programme signals recorded on said track, a magnetic head operatively positioned to react to said signals, means for moving the head in a backwards direction during each track stopping period to increase the relative speed of movement of the track with respect to the head during the said period to cause said head to scan a predetermined length of track moved during said stopping period, and prevent loss of any signal on said track during said stopping period, and means for thereafter returning the head to its normal position.

2. In a machine according to claim 1, means for moving the head in said backwards direction to scan a predetermined length of the track, means for storing any signals received by the head during its said backwards movement and means for using the stored signal to control the speed of the track on its being restarted with said step by step movement.

3. In a machine according to claim 2, a signal storage means and a signal gating means, means for coupling said gating means to said storage means, means for coupling said head to said gating means, and means for controlling the gating means whereby a signal recorded on said predetermined length of track is received by said head and fed to said storage means only when the head is moving in said backwards direction.

4. In a machine according to claim 3 comprising a first multivibrator and a second multivibrator to control the operation of said gating means, means for coupling the said first multivibrator to said gating means, means for causing the first multivibrator to close said gating means when said head is returning to its normal position, means for coupling the said second multivibrator to said gating means, and means for causing the second multivibrator to close said gating means until said predetermined length of track has passed the normal position of said head.

5. In a machine of the type in which the step by step forward movement of a body to a position where an operation is to be performed thereon is adapted to be controlled by a magnetic track movable step by step in synchronism with said body, discrete programme signals recorded on said track, a magnetic head operatively positioned to react to said signals, means for moving the head in a backwards direction during each track stopping period to increase the relative speed of movement of the track with respect to the head during the same period and means for thereafter returning the head to its normal position, means for storing any signals received by the head during its said backwards movement and means for using the stored signal to control the speed of the track on its being restarted with said step by step movement.

6. In a machine of the type in which the step by step forward movement of a body to a position where an operation is to be performed thereon is adapted to be controlled by a magnetic track movable step by step in synchronism with said body, discrete programme signals recorded on said track, a first pickup head operatively positioned with respect to said track, a second pickup head spaced from the first head and operatively positioned with respect to said track, whereby a recorded signal on the track reaches the first head and later reaches the second head, means operated by the first head to slow down the track on a recorded signal reaching the first head and means operated by the second head for stopping the track when said recorded signal reaches the second head and for moving the first head in a backwards direction to increase the relative speed of movement of the track with respect to the first head and means for returning the second head to its normal position.

7. In a machine of the type in which the step by step forward movement of a body to a position where an operation is to be performed thereon is adapted to be controlled by a magnetic track movable step by step in synchronism with said body, discrete programme signals recorded on said track, a first pickup head operatively positioned with respect to said track, a second pickup head spaced from the first head and operatively positioned with respect to said track, whereby a recorded signal on the track reaches the first head and later reaches the second head, means operated by the first head to slow down the track on a recorded signal reaching the first head and means operated by the second head for stopping the track when said recorded signal reaches the second head and for moving the first head in a backwards direction to increase the relative speed of movement of the track with respect to the first head and means for returning the second head to its normal position, means for storing any signals received by the first pickup head during said backwards movement and means for using the stored signal to control the speed of the track on its being restarted with said step by step movement.

8. In a machine according to claim 7, means for causing said track to start again in said step by step movement, a signal storage means and a signal gating means, means for coupling said gating means to said storage means, means for coupling said first head to said gating means, means for controlling the gating means whereby a signal recorded on said predetermined length of track is received by said first head and fed to said storage means only when the first head is moving in said backwards direction.

9. In a machine according to claim 8 comprising a first multivibrator and a second multivibrator to control the operation of said gating means, means for coupling the said first multivibrator to said gating means, means for causing the first multivibrator to close said gating means when said first head is returning to its normal position, means for coupling the said second multivibrator to said gating means, and means for causing the second multivibrator to close said gating means until said predetermined length of track has passed the normal position of said first head.

References Cited

UNITED STATES PATENTS 2,997,697 8/1961 MacAdam -------- 179—100.2

BERNARD KONICK, *Primary Examiner.*

R. SNIDER, *Assistant Examiner.*